Figure 1:
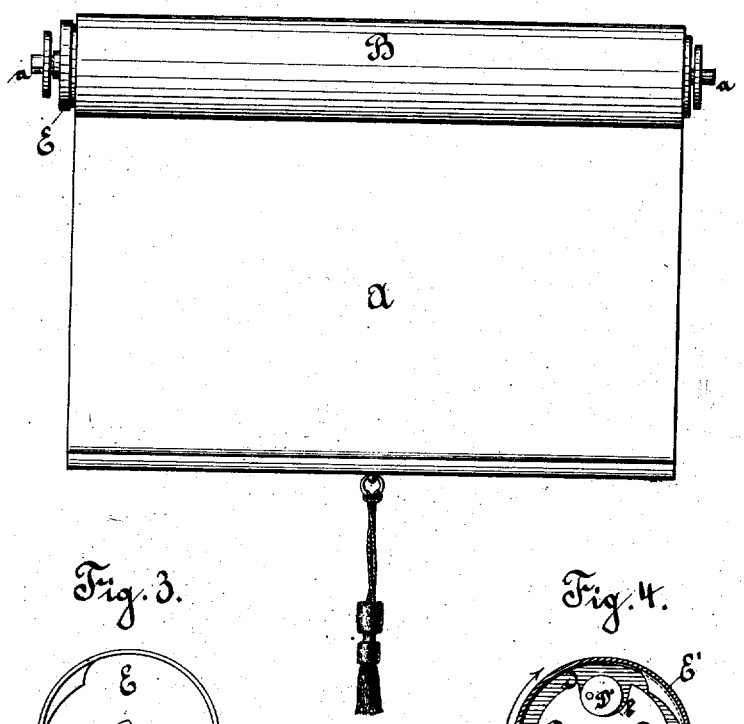

C. DE QUILLFELDT.

SPRING CURTAIN ROLLER.

No. 10,026. Reissued Feb. 7, 1882.

WITNESSES:

Sol. N. Rosenbaum.

Carl Kapp

INVENTOR

Charles de Quillfeldt

BY Paul Goepel.

ATTORNEY

UNITED STATES PATENT OFFICE.

CHARLES DE QUILLFELDT, OF NEW YORK, N. Y.

SPRING CURTAIN-ROLLER.

SPECIFICATION forming part of Reissued Letters Patent No. 10,026, dated February 7, 1882.

Original No. 159,803, dated February 16, 1875. Application for reissue filed November 17, 1881.

*To all whom it may concern:*

Be it known that I, CHARLES DE QUILLFELDT, of the city, county, and State of New York, have invented certain new and useful Improvements in Window-Shade Fixtures, of which the following is a specification.

In shade-fixtures with spring-rollers of that class in which the spring-acted roller is locked by pivoted pawls dropping into recesses or ratchets of the fixed shaft the locking action was caused by the force of gravity whenever the shade was allowed to be slowly wound up by the spring-acted roller. The locking action by gravity, however, could not take place when the shade was allowed to follow quickly the motion of the roller as imparted by the spring, as in this case the pawl was prevented from dropping into the recesses. This feature forms a main objection to the shade-fixtures with spring-rollers, as by the sudden escape of the shade from the hands of the person trying to adjust the same the shade is wound up with great rapidity around the roller and exposed to damage and injury in consequence of it. This happens often even to persons conversant with the peculiarities of these rollers, and still more frequently to persons who are not familiar with them, as they are not aware that a repeated pulling at the tassel of the shade and "feeling" for the pawl are necessary until the gravity-pawl engages the notched shaft or ratchet of the roller, so as to retain the shade in position. This causes sometimes great annoyance and dissatisfaction with this class of curtain-fixtures, though they are by their other advantages greatly preferable to the common cord or other roller-turning devices.

My invention has reference to an improved construction of spring shade-rollers in which, in place of the gravity-pawl used heretofore, centrifugal pawls are substituted, whereby the shade is positively and in an entirely automatic manner stopped and retained at any desired point or height without any possibility of the sudden escape and rapid winding up of the shade, so as to expose the shade to injury by the continuous and unexpected action of the roller-spring.

The invention consists of a spring-roller to the end plate of which are applied pivoted pawls, which are thrown by centrifugal force, owing to the action of the spring, against fixed stops of the end plate and against a stationary stop exterior to the end plate of the roller, but in the path of the pivoted pawls when thrown out. In this position of the pawls the pivots of the same, the stops, and the stationary contact-stop form three binding-points for the pivoted pawls, whereby the absolute and positive stoppage and retention of the roller are secured whenever the centrifugal force overcomes the gravity of the pawls, while by the slow upward motion of the shade the centrifugal force does not overcome the gravity of the pawls and allows them to clear the stationary exterior stop without binding thereon.

The invention consists more especially of a spring-roller the end plate of which is provided with eccentrically-pivoted pawls moving in stop-recesses of the end plate, in connection with an inclosing cap secured to the fixed shaft of the roller and having a stationary cam or stop within the path of the centrifugal pawls when thrown out.

Figure 3:
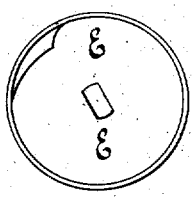
Figure 4:
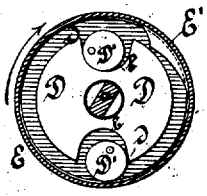
Figure 2:
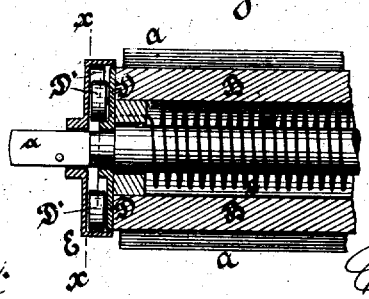

In the accompanying drawings, Figure 1 represents a front elevation of my improved shade-fixture applied to a window-curtain; Fig. 2, a detail vertical longitudinal section of the same; Fig. 3, a detail inside view of the roller-cap; and Fig. 4, an end view of the spring-roller, partly in section on the line *x x*, Fig. 2.

Similar letters of reference indicate corresponding parts.

In the drawings, A represents a window-shade; B, its roller, having a spiral spring, C, fitted within the interior hollow part of the same, said spring being attached at one end to the roller and at the other end to a projecting axle or shaft, *a*, which is set by its flattened sides into a fixed supporting-bracket, so as to be held in a stationary position, while the roller turns readily thereon by the action of the spring, as customary in this class of spring-rollers. The roller B is provided with an end plate, D, which is screwed or otherwise attached to the end of roller B and supplied with eccentrically-pivoted centrifugal pawls D′. These pawls D′ are arranged within recesses *b* of the end plate, D, said recesses forming at one side of the pawls D′ stops *d*, against which the pawls are thrown whenever the centrifugal force exerted thereon by the roller-spring overcomes their gravity. The centrifugal pawls D′ are inclosed by a cap, E, keyed to the fixed roller-shaft, which cap serves to cover and protect the pawls. This cap E is provided at its inner circumference with a cam or stop, E′, which is exterior to and stationary relatively to the end plate of the roller, and so arranged as to be in the path of the pawls when thrown out by centrifugal force. This cam or stop E′ may be made of triangular shape, of which the shorter and steeper side is arranged toward the direction of motion of the roller when the same is wound up by the spiral spring, while the other longer and gentler inclined side is arranged toward the opposite or unwinding direction of the roller. The unwinding motion of the roller carries the pawls past the cam or stop E′ without engaging the same as the pawls are forced back by the contact therewith. If it is desired to wind up the shade, the roller is allowed to turn slowly, in which case the pawls clear the stop or cam E′ by gravity. Whenever it is desired to stop the shade at any point or height the roller is allowed to turn quicker, so that the centrifugal force imparted to the pawls overcomes their gravity and throws them into the path of the stationary stop E′. The contact of the pawl D′ with the stationary stop E′ and its side stop, *d*, interrupts the rotation of the roller and stops the shade. In this position of the pawl D the pivot-pin of the same, the side stop, *d*, and the stationary stop E′ form three binding-points, which are so disposed relatively to each other as to cause the reliable locking of the pawl and roller. Should the shade be suddenly released, intentionally or accidentally, the pawls are instantly thrown out by the centrifugal force imparted thereon by the rapid turning of the roller, so as to strike against one of the fixed stops *d* of the end plate and against the stationary stop E′, and be locked thereby in a positive and automatic manner. This forms the essential feature of my invention, as contradistinguished from the action of spring-rollers with gravity-pawls.

Having thus described my invention, I claim as new and desire to secure by Letters Patent—

1. The combination, in a spring shade roller, of the end plate, having pivoted centrifugal pawls and stops for the pawls, with a stationary contact-stop exterior to the end-plate, against which and the stops of the end plate the pawls are thrown whenever the centrifugal force overcomes the gravity of the pawls, substantially as set forth.

2. In a spring-roller, the combination of the end plate, having pivoted centrifugal pawls and stops for the pawls, with a stationary exterior contact-stop which is engaged by the pawls when they are thrown out by centrifugal power, but which is cleared by the same when their gravity overcomes the centrifugal force, substantially as and for the purpose set forth.

3. In a spring shade-roller, the combination of centrifugal pawls pivoted to the end plate of the roller, a stop for each pawl, and a stationary contact-stop secured to the fixed axle or shaft of the roller, said contact-stop projecting into the path of the centrifugal pawls, so that the roller is stopped by the pawls when they are thrown by centrifugal force against the stops, as described.

4. In a spring shade-roller, the combination of centrifugal pawls applied to pivots of the end plate of the roller, a stop for each pawl, a stationary contact-stop within the path of the centrifugal pawls, the pivot of each pawl, the stop of each pawl, and the stationary contact-stop being so arranged relatively to each other as to form three binding-points for the pawl and lock the spring-roller when the centrifugal force exerted on the pawls overcomes the gravity of the same, substantially as set forth.

5. The combination, in a spring shade-roller, of an end plate, having eccentrically-pivoted centrifugal pawls and a fixed stop for each pawl, with a stationary contact-stop secured to the fixed axle or shaft of the roller, substantially as set forth.

6. The combination, in a spring shade-roller, of the end plate, D, having pivoted centrifugal pawls D′ and fixed stops *d*, with a stationary exterior cam or stop, E′, substantially as described.

7. The combination, in a spring shade-roller, of the end plate, D, having centrifugal pawls D′ and stop-recesses *b d*, with an inclosing-cap, E, secured to the shaft *a*, and provided with a cam or stop, E′, substantially as specified.

C. DE QUILLFELDT.

Witnesses:
PAUL GOEPEL,
CARL KARP.